April 18, 1961  E. O. SCHONSTEDT  2,980,363
FLUID GYROSCOPE FOR INDICATING ORIENTATION
OF A SPINNING MISSILE
Filed Oct. 29, 1952  3 Sheets-Sheet 1
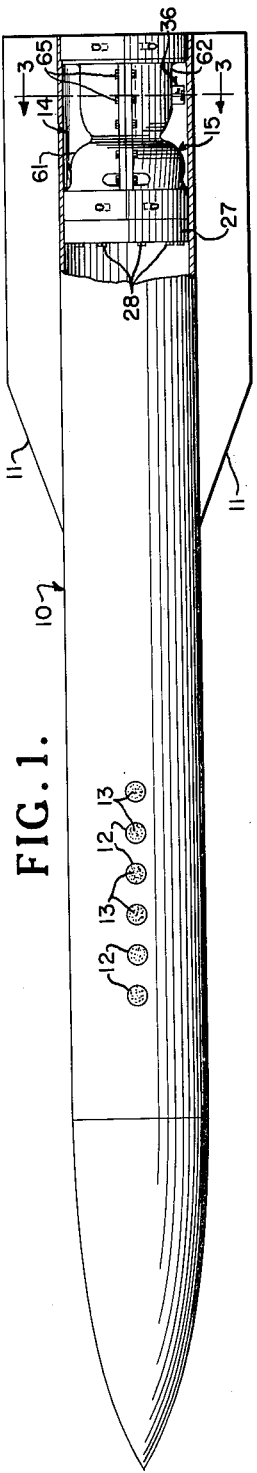
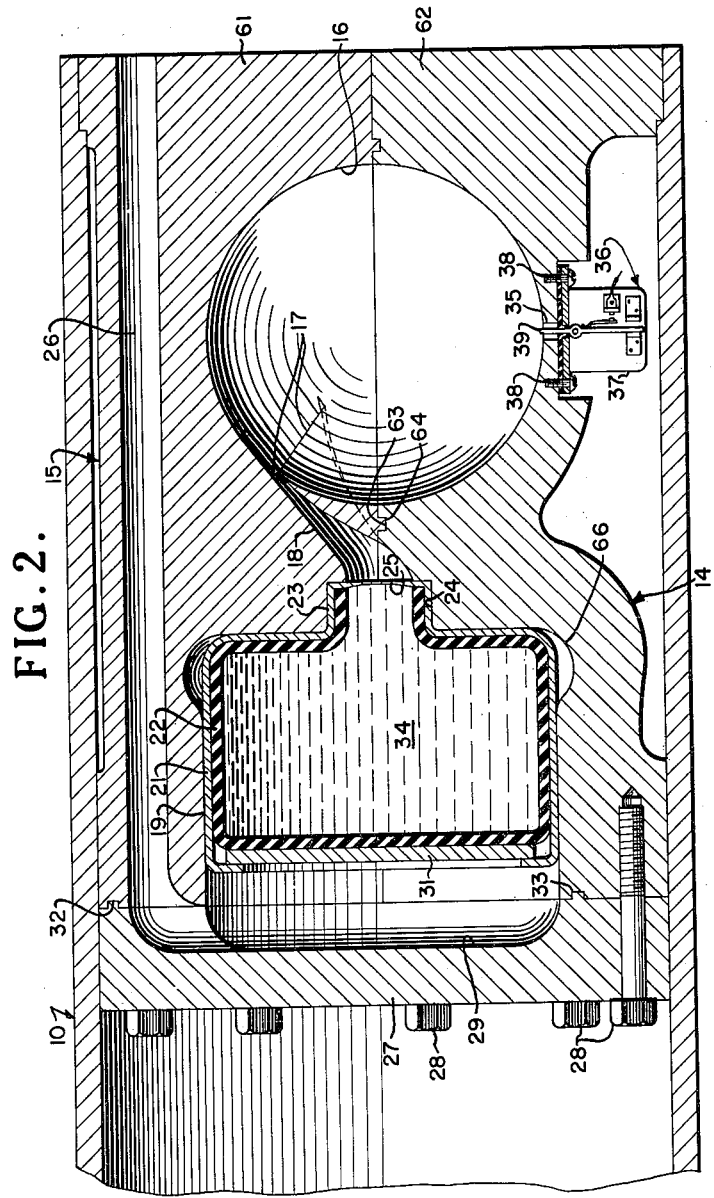
INVENTOR
ERICK O. SCHONSTEDT
BY
ATTORNEYS April 18, 1961  E. O. SCHONSTEDT  2,980,363
FLUID GYROSCOPE FOR INDICATING ORIENTATION
OF A SPINNING MISSILE
Filed Oct. 29, 1952  3 Sheets-Sheet 2
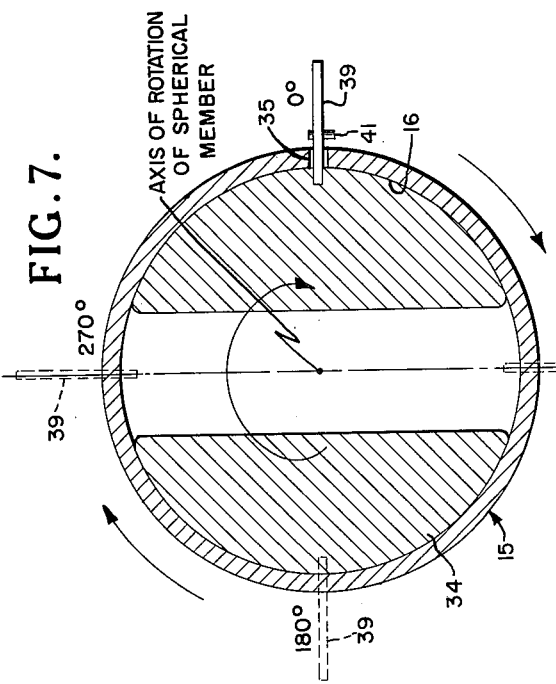
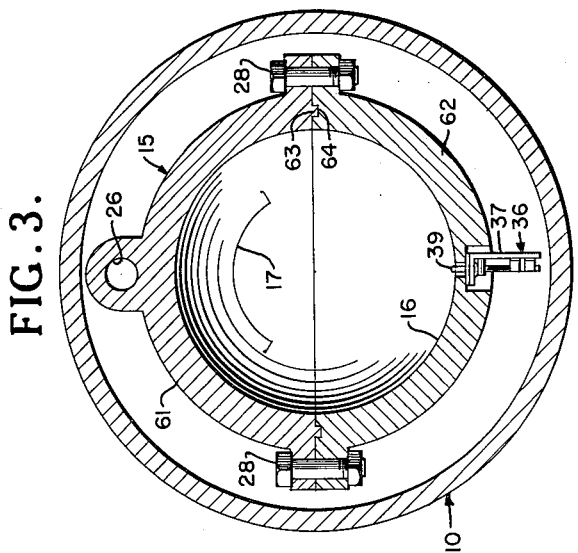
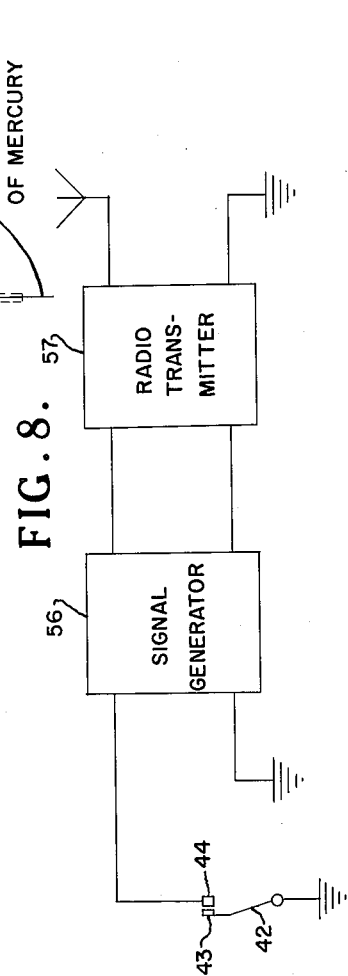
INVENTOR
ERICK O. SCHONSTEDT
BY
ATTORNEYS April 18, 1961 E. O. SCHONSTEDT 2,980,363
FLUID GYROSCOPE FOR INDICATING ORIENTATION
OF A SPINNING MISSILE
Filed Oct. 29, 1952 3 Sheets-Sheet 3
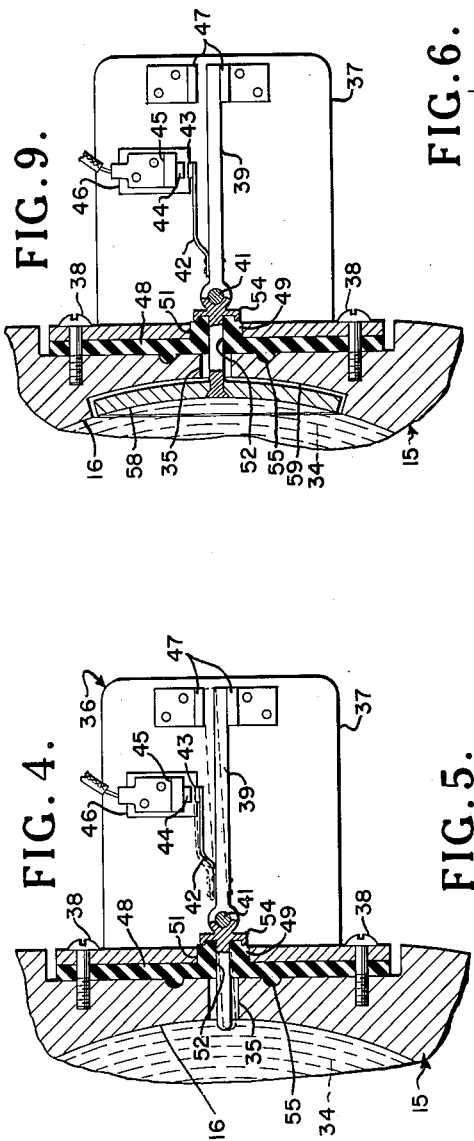
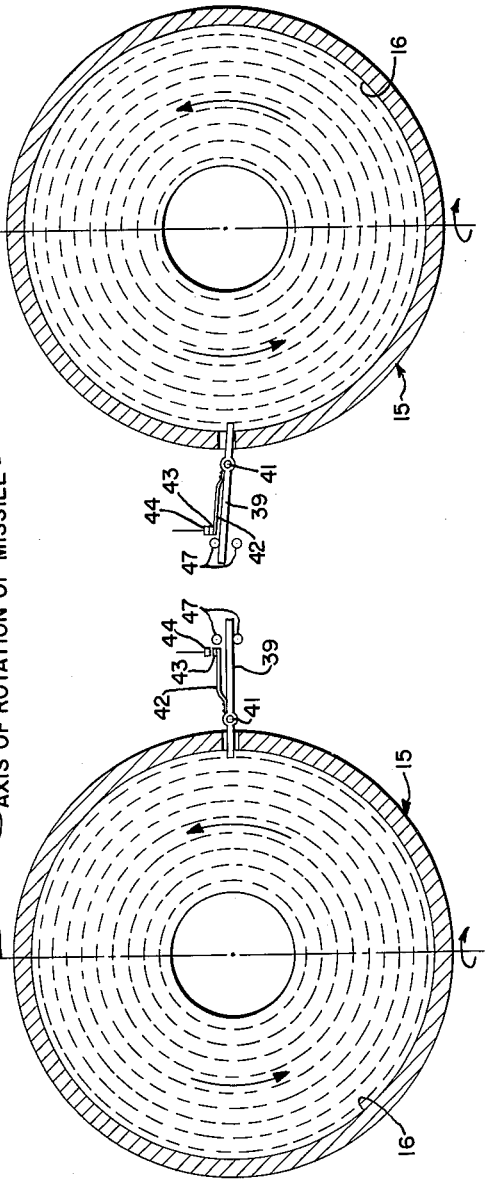
INVENTOR
ERICK O. SCHONSTEDT
BY
G. O'Brien
R. M. Hicks
ATTORNEYS

United States Patent Office 2,980,363
Patented Apr. 18, 1961

2,980,363

FLUID GYROSCOPE FOR INDICATING ORIENTATION OF A SPINNING MISSILE

Erick O. Schonstedt, Silver Spring, Md., assignor to the United States of America as represented by the Secretary of the Navy Filed Oct. 29, 1952, Ser. No. 317,607

7 Claims. (Cl. 244—14)

(Granted under Title 35, U.S. Code (1952), sec. 266)

The invention described herein may be manufactured and used by or for the Government of the United States of America for governmental purposes without the payment of any royalties thereon or therefor.

The present invention relates to fluid gyroscopes, more particularly the invention relates to a gyroscope in which a suitable fluid is employed as a rotor element in a hollow sphere fixedly mounted in a body such, for example, as a gun-launched missile rotatable on an axis substantially perpendicular to the axis of rotation of the fluid. It is of particular importance that the rotative orientation of a missile be known during the flight thereof where such missile contains a steering charge, such as disclosed in the copending application of H. J. Plumley for Method and Apparatus for Steering a Gun-Launched Missile, Serial No. 131,441, filed December 6, 1949.

Apparatus is provided in the present invention for injecting, during the launching of the missile, a quantity of fluid at high velocity tangentially into the sphere, thus the fluid will continue to rotate within the sphere on a substantially fixed axis in the manner of a gyroscope for a sufficient period of time to accomplish the purpose of the invention as will be hereinafter more fully described. An electrical circuit closing device is attached to the exterior of the sphere and has extending within the sphere and in contact with the rotating fluid, an operating pivoted rod or plate for closing the circuit when the fluid is rotating in a selected direction. It is apparent that as the missile rotates on one axis and the fluid rotates on a fixed axis perpendicular to the first axis the fluid will contact the rod or plate in successive opposed directions of rotation, thus the rod or plate will be urged first in a circuit closing direction and then in non-circuit closing direction during each revolution of the missile. When the circuit closing device is in closed position, a signal generating circuit is energized thus to transmit such signal to receiving apparatus located at the point of launching of the missile. In this manner, it is apparent that the rotational orientation of the missile is made known at the launching point of the missile.

An object of the present invention is to provide a new and improved gyroscopic apparatus for making known the rotational orientation of a spinning missile.

Another object is to provide a new and improved fluid gyroscope mounted in a missile having a remotely controlled directional charge, the gyroscope having a rotational axis substantially perpendicular to the spinning axis of the missile, having apparatus for closing a circuit once per revolution thus to transmit a signal indicative of the rotational orientation of the missile.

Still another object is to provide a gyroscope having a fluid rotor and mounted in a spinning missile, the spinning axis of the missile being perpendicular to the axis of rotation of the fluid, there being substantially no tendency of the liquid rotor to precess during the flight of the missile.

A further object of the invention is to provide a gyroscopic apparatus for indicating the rotational orientation of a spinning missile and which has a minimum of operating parts, is economical to manufacture and is highly efficient for the purpose intended.

Other objects and many of the attendant advantages of this invention will become readily appreciated as the same becomes better understood by reference to the following detailed description when considered in connection with the accompanying drawings wherein:

Fig. 1 indicates inside elevation, a gun-launched missile having a steering charge and having the tail portion broken away to show the device of the present invention mounted therein;

Fig. 2 is an enlarged view partly in elevation and partly broken away of the device of the present invention;

Fig. 3 is sectional view taken along the line 3—3 of Fig. 1;

Fig. 4 is an enlarged detail view of the switch mechanism showing the two positions thereof;

Fig. 5 is a diagrammatic section through the spherical member and showing the switch operating lever at the start of a revolution of the member;

Fig. 6 is a view similar to Fig. 5 and showing the spherical chamber rotated 180°;

Fig. 7 is a sectional view of the spherical chamber taken at right angles to that of Figs. 5 and 6;

Fig. 8 is a block diagram of the electrical circuit of the invention; and

Fig. 9 is a modification of the switch operating lever.

Referring more particularly to the drawings wherein like numerals indicate like parts throughout the several views, 10 indicates generally a gun-launched missile having a canted tail fin structure 11 for imparting a desired rotational speed to the missile 10 during the flight thereof. A plurality of bores 12 contain charges 13 for changing the path of flight of the missile 10 by remote control as described in the aforementioned copending application. Mounted within the tail portion of missile 10 is the fluid gyroscope of the present invention indicated generally at 14, and comprising a strong metallic casing 15 having a spherical chamber or portion 16 formed axially therein, the axis of the chamber being coincident to the spinning axis of missile 10. The chamber 16 has a port 17 which communicates through tangential conduit 18 with a recess 19 in casing 15. Recess 19 receives a collapsible container 21 having a rubber liner or sac 22. Container 21 has a nipple 23 which extends into receiving socket 24 of conduit 18. Nipple 23 has a rupturable diaphragm 25 initially closing off container 21 from conduit 18.

A bore 26 is formed in casing 15 and opens at the trailing end of missile 10 to receive a portion of the gases generated by the explosion of a propelling charge (not shown) for missile 10. A cover or head 27 is secured to casing 15 by a plurality of bolts 28 and has formed therein a recess 29 communicating with bore 26 to direct the explosive gases against an impact plate 31 of container 21. Head 27 is provided with a rib 32 which snugly fits in groove 33 of casing 15 to provide a substantially leakproof joint therebetween.

The foregoing apparatus is provided for injecting into spherical portion or chamber 16 a quantity of mercury or other suitable liquid 34 at high velocity, the liquid 34 entering tangentially portion 16 to rotate therein on a fixed axis in the manner of a gyroscope as the spherical chamber 16 rotates on the spinning axis of the missile 10, the two axes being substantially perpendicular to each other.

Gases generated by the propelling charge enter recess 19 through bore 26 and head recess 29 at high pressure against impact plate 31 thus collapsing container 21 and sac 22. As these members collapse, pressure developed within the members causes diaphragm 25 to rupture and mercury 34 to be ejected therefrom and into conduit 18. Thence the mercury 34 is injected at high velocity into chamber 16 through port 17. In order to fixedly retain container 21 in the collapsed condition thereof an annular groove 66 is provided in recess 19 into which container 21 is expanded during the collapse thereof. When container 21 has collapsed, pressure within the chamber 16 will not be sufficient to force the container to expand thus the mercury will remain within chamber 16 and continue to rotate therein during the flight of the missile. While it is contemplated that the entry of mercury 34 into chamber 16 will compress the air contained therein, it is conceivable that the air may be evacuated therefrom or that a relief valve may be attached thereto to permit the air to escape and to prevent escape of the mercury.

It is desirable that the casing 15 be formed of two parts 61 and 62 to facilitate the manufacture and assembly thereof. Interfitting ribs and grooves 63 and 64 respectively are provided at the abutting faces of members 61 and 62 to prevent leakage therebetween. A plurality of bolts 65 secure the parts 61 and 62 together at the flanged peripheries thereof.

Spherical chamber 16 is provided with a bore 35 in substantial alignment with the port 17. A switch assembly indicated generally at 36 is mounted on a support 37 secured on casing 15 by screws 38. A lever 39 extends a short distance into spherical chamber 16 and into the path of mercury 34 when the mercury is injected into the chamber 16 and during the rotation of the mercury thereafter. Lever 39 is pivoted at 41 and has mounted thereon a spring member 42 having a contact 43. A fixed contact 44 is supported by bracket 45 which is fixed to plate 37 and is insulated therefrom by insulator block 46. A pair of stop members 47 are mounted on plate 37 adjacent the outer end of lever 39 to limit movement thereof and to prevent excessive pressure on contacts 43 and 44.

Interposed between plate 37 and casing 15 is a rubber gasket 48 having an extension 49 extending into bore 51 of plate 37. Gasket 48 has a bore 52 through which lever 39 extends. Gasket 48 tightly engages the cup-shaped portion 54 of lever 39 to prevent leakage of mercury out of chamber 16 and also yieldably holds lever 39 in a position where contacts 43 and 44 are disengaged. If desired, casing 15 may be provided with a circular groove 55 around bore 35 into which gasket 48 is compressed to further prevent leakage of mercury 34.

Missile 10 during the flight thereof rotates about its longitudinal axis by reason of the canted fins 11. Mercury 34, by reason of the position of conduit 18, rotates during the flight of the missile on an axis substantially perpendicular to the axis of rotation of the missile. Mercury 34, acting as the rotor of a gyroscope, remains rotating on a fixed axis as spherical chamber 16 rotates around the mercury on the axis of missile 10, thus lever 39 engages mercury rotating in one direction on one side or at 0° of rotation of the missile and engages mercury rotating in the opposite direction on the other side or 180° of rotation of the missile as is clearly shown in Fig. 7 of the drawings.

Movement of mercury 34 within spherical chamber 16 exerts a pressure on first one side of lever 39 and then the other during each revolution of the missile. As shown in Figs. 5 and 6 pressure on one side of lever 39 causes the lever to bear against one of the stop members 47 and to cause contacts 43 and 44 to engage, as shown in the 180° position, Fig. 6. As the lever passes through the area adjacent the axis of rotation of the mercury, it being conceivable that no mercury is present in this area, gasket 48 will urge the lever into a position to disengage contacts 43 and 44 and to engage the other stop 47. Rotation of the lever 39 through the other side of the rotating mercury will only cause lever 39 to more firmly engage one of the stops 47, the contacts 43 and 44 remaining open, as shown in the 0° position, Fig. 5. It will thus be seen that contacts 43 and 44 are closed for a first period and open for a second period of each revolution of the missile during the flight thereof.

Contacts 43 and 44 close a signal generating circuit 56 [Fig. 8] thus producing a signal to be transmitted by radio transmitter 57 to a radio receiver [not shown] located at the launching point of the missile and thence to a control system for firing the steering charge of the missile at a desired distance with respect to the target and at a desired point with respect to the rotative position of the missile.

An alternate form of circuit closing mechanism is disclosed in Fig. 9 of the drawings wherein the lever 39 is provided at the inner end thereof with a concave plate 58 set in a recess 59 in spherical chamber 16 of casing 15 and following the inner contour thereof. Otherwise the circuit closing mechanism is similar to switch assembly 36, with the casing 15 formed of two halves joined together in order to assemble the plate 58 in the chamber 16. In the alternate form, surface friction of the spinning mercury 34 on the surface of plate 58 causes the lever 39 to incline in the same manner as in the preferred form of the invention.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Orientation indicating mechanism for a spinning missile containing a steering charge and comprising, in combination, a hollow spherical member fixed in said missile for rotation therewith, an injection conduit tangentially mounted on said spherical member and communicating with the interior thereof, a quantity of mercury contained in a collapsible container and communicating with said spherical member through said conduit, frangible sealing means interposed between said container and said conduit, means for suddenly collapsing said container as the missile is launched thereby to break said frangible means to inject said mercury into said spherical member at high velocity and to cause said mercury to rotate at high speed in said spherical member about an axis substantially perpendicular to the spinning axis of said missile, means extending into the path of said mercury and rotating about the spinning axis of said missile in unison therewith for sensing apparent changes in direction of rotation of said mercury as the missile spins, and circuit closing means in operative connection with said sensing means for operation during travel of the sensing means through said mercury a portion of each revolution of the missile.

2. Orientation indicating apparatus for an axially spinning gun-launched missile containing a steering charge and comprising, in combination, a hollow spherical member fixedly mounted and coaxially aligned in said missile for rotation therewith, a collapsible member, means connecting said collapsible member with said spherical member, a frangible diaphragm interposed between said collapsible member and said spherical member for initially maintaining said collapsible member closed, a quantity of mercury contained in said collapsible member, means surrounding said collapsible member and communicating with the trailing end of said missile whereby a portion of the gases generated by the propelling charge for said missile is directed against said collapsible member under high pressure during launching of said missile thereby to collapse said collapsible member, said mercury being injected into said spherical member at high velocity to rotate therein on an axis substantially perpendicular to the spinning axis of said missile, and means mounted on said spherical member and extending thereinto for sensing apparent changes of direction of rotation of said mercury as the spherical member spins thereabout.

3. Orientation indicating apparatus for an axially spinning gun-launched missile containing a steering charge and comprising, in combination, a hollow spherical member fixedly mounted in said missile on the spinning axis thereof and adapted to rotate with said missile, pressure operated means for injecting at high velocity a quantity of mercury into said spherical member, a conduit communicating with said pressure operated means and opening to the rear of said missile to receive a portion of the propelling gases generated during the launching of said missile thereby to operate said pressure operated means, said injecting means being arranged to inject said mercury tangentially with respect to said spherical member and in a direction to rotate within said spherical member about an axis perpendicular to the axis of rotation of said missile, and means rotatable with said spherical member and influenced by the rotation of said mercury to generate a signal for a portion of each revolution of said missile.

4. Orientation indicating apparatus for an axially spinning gun-launched missile having a steering charge and comprising, a telemetering means including a signal generating circuit and a radio frequency transmitting circuit, a hollow spherical member fixedly mounted in said missile and adapted to spin therewith, means including a chamber filled with a heavy fluid and operated as said missile is launched for tangentially injecting into said spherical member a quantity of heavy fluid at high velocity whereby said fluid is caused to rotate in said spherical member at a high rate of speed and about an axis substantially perpendicular to the spinning axis of said missile, a lever having one end thereof extending into said spherical member and adapted to intersect said fluid as the missile spins, said lever being moved in a first direction by said fluid during one portion of a revolution and in the opposite direction during another portion of a revolution and switch means connected in said signal generating circuit and attached to said lever thereby to operably close said signal generating circuit only when said lever is moved in said first direction whereby a signal is generated and transmitted by said transmitting circuit for a portion of each revolution.

5. Orientation indicating apparatus for a spinning gun-launched missile containing a steering charge and comprising, in combination, a collapsible reservoir in said missile, a quantity of mercury in said reservoir, frangible sealing means for said reservoir, pressure means for collapsing said reservoir and expelling said mercury therefrom as the frangible means breaks, a spherical member fixedly mounted in said missile and rotatable on the spinning axis thereof, means for directing said mercury tangentially into said member for rotation on an axis substantially perpendicular to the spinning axis of said missile, means extending into said spherical member and rotatable therewith for sensing apparent rotational direction of said mercury as said sensing means moves through said mercury, and signal means operated by said sensing means where said mercury is moving past the sensing means in one direction.

6. Orientation indicating apparatus for a gun-launched spinning missile having a steering charge mounted therein and comprising, in combination, a hollow spherical member mounted in said missile on the spinning axis thereof and rotatable therewith, a collapsible reservoir mounted adjacent said spherical member, a quantity of mercury in said reservoir, means for conducting said mercury from said reservoir to said spherical member, said last named means injecting said mercury into the hollow spherical member tangentially for rotation therein on an axis perpendicular to the spinning axis of the missile, means operative as the missile is launched for collapsing said reservoir thereby to cause the ejection of the mercury from the reservoir, said spherical member having an orifice perpendicular to the axis of rotation thereof, a pivotally mounted lever having one end thereof extending through said orifice a distance into said spherical member and into the path of said rotating mercury, a pair of stops mounted adjacent the other end of said lever for limiting the movement thereof, a movable contact mounted on one side of said lever, a fixed contact mounted adjacent said lever and adapted to be engaged by said movable contact when the lever moves in one direction and to be disengaged as the lever moves in the opposite direction whereby the lever is moved to close said contacts for a portion of each revolution of the missile, and signal means energized by the closing of said contacts to indicate rotational orientation of said missile.

7. Orientation indicating apparatus for a spinning gun-launched missile containing a steering charge and comprising, in combination, a hollow spherical member fixed in said missile for rotation therewith, an injection tube tangentially mounted on said spherical member and communicating with the interior thereof, a quantity of mercury contained in a collapsible container and communicating with said spherical member through said tube, frangible sealing means interposed between said container and said tube, means for suddenly collapsing said container as the missile is launched thereby to break said frangible means to inject said mercury into said spherical member at high velocity and to cause said mercury to rotate at high speed in said spherical member about an axis substantially perpendicular to the spinning axis of said missile, a pivoted lever having one end thereof extending into said spherical member, a concave plate mounted on said extended end, the concavity of said plate following the inner contour of said spherical member and moving said lever by surface friction of said mercury thereon as the mercury rotates, switch means operated by said lever as the lever moves.

References Cited in the file of this patent

UNITED STATES PATENTS

| | | |
|---|---|---|
| 863,035 | Maul | Aug. 13, 1907 |
| 1,841,606 | Kollsman | Jan. 19, 1932 |
| 2,158,180 | Goddard | May 16, 1939 |